July 28, 1953 M. RETTINGER 2,647,167

MAGNETIC TRANSDUCER CONSTRUCTION

Filed March 21, 1950

INVENTOR.
Michael Rettinger
BY Orl R. Goshaw
ATTORNEY

Patented July 28, 1953

2,647,167

UNITED STATES PATENT OFFICE 2,647,167

MAGNETIC TRANSDUCER CONSTRUCTION

Michael Rettinger, Encino, Calif., assignor to Radio Corporation of America, a corporation of Delaware Application March 21, 1950, Serial No. 150,875

1 Claim. (Cl. 179—100.2)

This invention relates to magnetic transducers, and particularly to the construction of magnetic recording, reproducing, and erasing heads used in magnetic sound recording and reproduction.

One well-known form of magnetic head comprises a core, having one or more gaps therein, and a winding around the core. Voltages are impressed on the winding to produce magnets in a magnetizable medium passing the gap contacted by the medium, or voltages are induced in the winding by magnets in the medium as it passes this gap. Another form of magnetic head is of the single conductor or inductor type, such as is shown in U. S. Patent No. 2,247,847, and also, in U. S. Patent No. 2,418,542, the latter also showing the first mentioned form of head. Another flat, U-shaped form of single conductor head is disclosed in Albert W. Friend co-pending application, Ser. No. 63,044, filed December 2, 1948, entitled "Magnetic Applicators." The present invention is a construction for a head of the single conductor type, particularly one using a flat conductor, one edge of which contacts the magnetic medium for either recording or reproducing, and which could also be used for erasing the magnets produced in the medium by the recording operation.

A main feature of the new magnetic head is that it may be used for simultaneously recording a plurality of parallel magnetic tracks in a magnetizable medium with the minimum of elements. A similar construction may be used to record and reproduce a push-pull form of magnetic record. All the advantages described in the above-mentioned co-pending application will be obtained with the present head construction plus the feature of multiple track recording and reproduction.

The principal object of the invention, therefore, is to facilitate the recording, reproduction, and erasing of a plurality of magnetic records or tracks.

Another object of the invention is to provide an improved multiple track magnetic recording system and head.

A further object of the invention is to provide an improved magnetic head construction having high efficiency with a minimum number of elements.

Although the novel features which are believed to be characteristic of this invention will be pointed out with particularity in the appended claim, the manner of its organization and the mode of its operation will be better understood by referring to the following description, read in conjunction with the accompanying drawings, forming a part hereof, in which:

Figures 1, 2, 6:
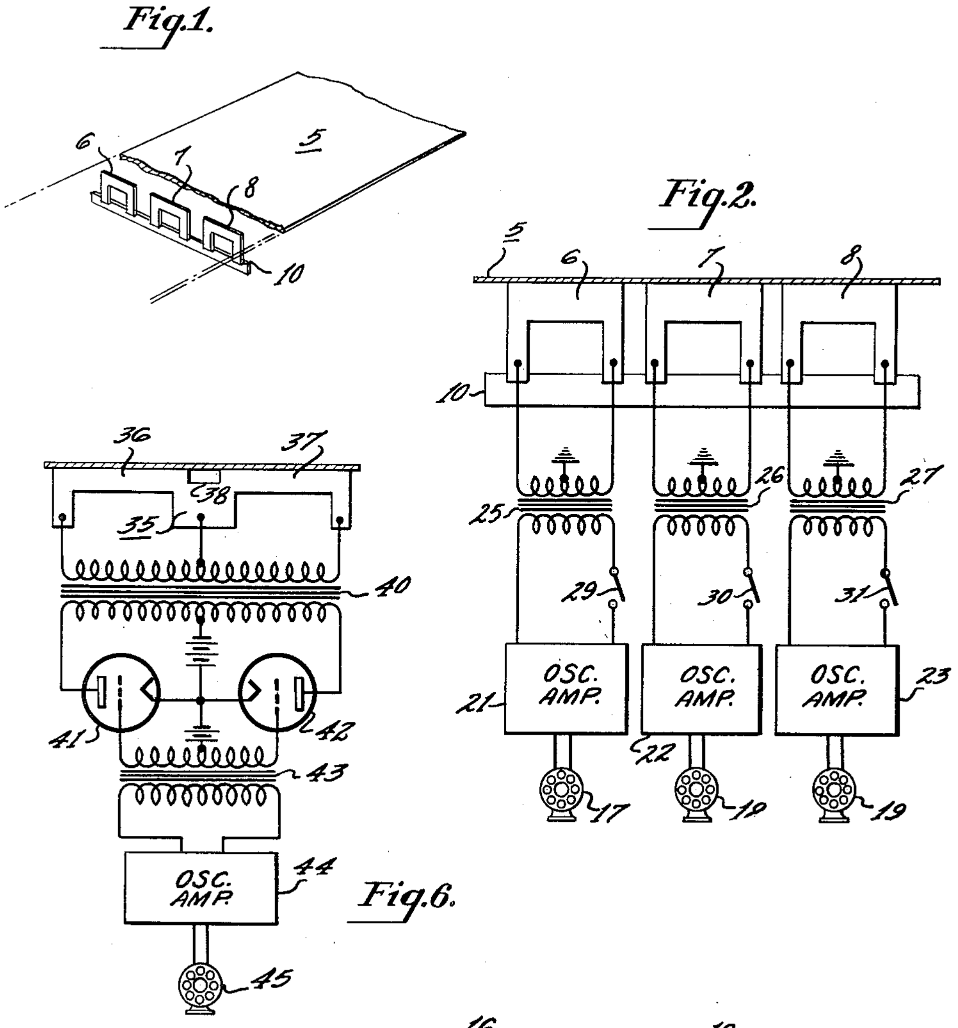
Fig. 1 is a perspective view showing the relationship of the multiple inductive elements of the head and the magnetic medium.
Fig. 2 is a schematic view of the multiple recording circuits connected to the different inductive elements of the head.
Figure 4:
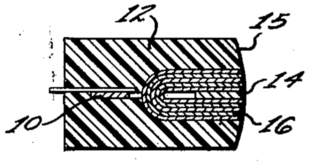
Figure 3:
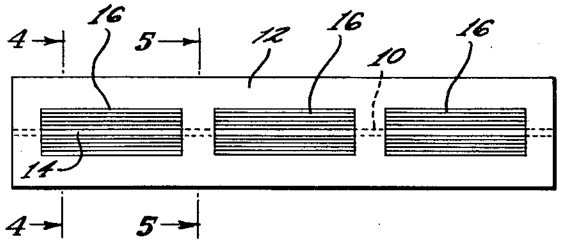
Fig. 3 is a view looking at the working face of the magnetic head.
Figure 5:
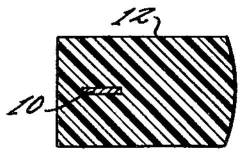

Figs. 4 and 5 are cross-sectional views, taken along the lines 4—4 and 5—5, respectively, of the head of Fig. 3, and Fig. 6 is a view of a push-pull recording system using a modified form of the head.

Referring now to the drawings, in which the same numerals identify like elements, a medium 5 of any well-known type of magnetizable tape or film is adapted to be moved into contact with a plurality of thin, flat, U-shaped inductor elements 6, 7, and 8 mounted on a thin, flat supporting bar 10, the elements having working edge sections and leg sections. The elements 6, 7, and 8 may be of conductive non-magnetic material, such as beryllium copper, while the bar 10 may be of high-resistance material, such as Nichrome, the elements 6, 7, and 8 being attached thereto by welding or in any other suitable manner. The elements 6, 7, and 8 are mounted or embedded in a block of insulating material, such as rubber or plastic 12. Surrounding the working sections of the U-shaped elements 6, 7, and 8, but electrically insulated from them by a thin sheet of paper or lacquer, one of which is shown at 14, are a plurality of thin layers 16 of highly permeable ferro-magnetic sheet material, such as Permalloy or mu-metal. The thickness and other dimensions of these elements may be of the order set forth in the above-mentioned co-pending application. The remaining portion of the head is formed of the insulating material 12. The working face is curved, as shown at 15, so as to insure contact of the working edges of the elements 6, 7, and 8 with the medium 5. The head may be mounted within an outer protective shield, if desired.

As shown in Fig. 2, the individual recording circuits may comprise microphones 17, 18, and 19 connected to oscillator-amplifiers 21, 22, and 23, as are well-known in the art. The outputs of the respective units 21, 22, and 23 are connected with the primaries of transformers 25, 26, and 27, respectively, when switches 29, 30, and 31 are closed. The mid-taps of the secondaries of transformers 25, 26, and 27 are grounded, while the terminals thereof are connected to the leg sections of the respective inductor elements 6, 7, and 8. Since the supporting bar 10 is of a highly resistive material, the leg sections of the elements will not be short-circuited by connection thereto, and the currents will, therefore, flow through the elements 6, 7, and 8 in the usual manner.

As mentioned above, the above circuits are shown as recording circuits whereby various types of input signals from the microphones 17, 18, or 19, or other sources, such as previously recorded records, may be recorded as three tracks on the medium 5, it being understood that the three tracks may also be of different frequency portions or amplitudes of the same signal. The head may be used to reproduce the signal simply by connecting the head elements 6, 7, and 8 to separate reproducing circuits, as is well-known in the art. For erasing, elements 6, 7, and 8 are connected to an oscillator only.

A form of head suitable for the recording of a push-pull track may simply consist of a single element, such as shown at 35 in Fig. 6, this element having two working sections 36 and 37, separated by a notch 38. The outer legs of the element 35 are connected to the secondary of a transformer 40, the mid-tap of which is connected to the center leg of the element 35. The primary of the winding 40 is connected to the anodes of push-pull connected tubes 41 and 42 having an input transformer 43 connected to the usual form of oscillator-amplifier unit 44 fed by a microphone 45, as shown in Fig. 2. The action of a push-pull circuit permits a single element 35 to be used, since the decrease in current in one of the sections 36 is accompanied by a corresponding increase in current in the section 37. The sections 36 and 37 are surrounded by the same stampings 16, and since it does not require a mounting bar, such as 10, the head has fewer parts and may be constructed very economically. As in Fig. 2, the head of Fig. 6 may be used to pick up the push-pull signals in the record medium by connecting the sections 36 and 37 in push-pull to a push-pull reproducing amplifier circuit. The head may also be used for erasing by connecting it to an oscillator only.

There is thus provided a very simple and economical multiple track magnetic head, which may be used for recording, reproducing, or erasing separate and individual magnetic tracks or a push-pull track.

I claim:

A push-pull magnetic head comprising a flat inductor element having two sections, an edge of each section being adapted to contact a magnetizable or magnetized medium, each section having an end leg forming one terminal connection and a common center leg forming a second terminal connection for each section, core material surrounding each section, except for the edges thereof adapted to contact said medium, and an insulating material for maintaining said element and core material in fixed positions with respect to one another.

MICHAEL RETTINGER.

References Cited in the file of this patent

UNITED STATES PATENTS

| Number | Name | Date |
|---|---|---|
| 2,468,601 | Long | Apr. 26, 1949 |
| 2,469,444 | Roys | May 10, 1949 |
| 2,479,308 | Camras | Aug. 16, 1949 |
| 2,508,485 | Begun | May 23, 1950 |
| 2,513,653 | Kornei | July 4, 1950 |
| 2,532,100 | Howell | Nov. 28, 1950 |
| 2,536,272 | Friend | Jan. 2, 1951 |
| 2,540,654 | Cohen | Feb. 6, 1951 |